Feb. 11, 1936.                J. D. KELLER                2,030,523
                            CARBON PILE METER
                          Filed Oct. 9, 1930          3 Sheets-Sheet 1

INVENTOR.
J. D. Keller

Feb. 11, 1936.     J. D. KELLER     2,030,523
CARBON PILE METER
Filed Oct. 9, 1930     3 Sheets-Sheet 2

INVENTOR.
J. D. Keller.

Feb. 11, 1936.  J. D. KELLER  2,030,523
CARBON PILE METER
Filed Oct. 9, 1930  3 Sheets-Sheet 3

J. D. Keller INVENTOR.

Patented Feb. 11, 1936

2,030,523

UNITED STATES PATENT OFFICE 2,030,523

CARBON PILE METER

John Donald Keller, Pittsburgh, Pa.

Application October 9, 1930, Serial No. 487,489

10 Claims. (Cl. 177—351)

My invention relates to means for modifying the relation between the electrical resistance of carbon piles, or the electrical characteristics of other piezo-electric elements, and the pressure applied to such piles or elements. One object of the invention is to provide carbon piles suitable for use in flow-meters for measuring fluid flow, and to obviate the troubles which have been encountered from hysteresis, and from instability of the zero setting of the carbon piles when used in such meters.

Figure 1:
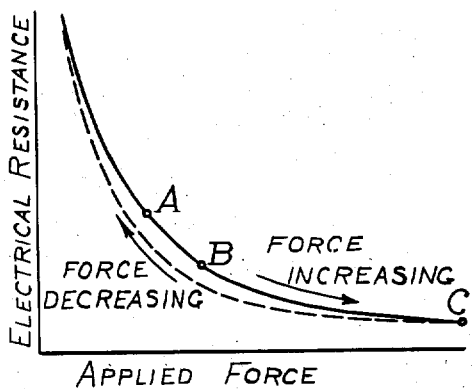
Figure 2:
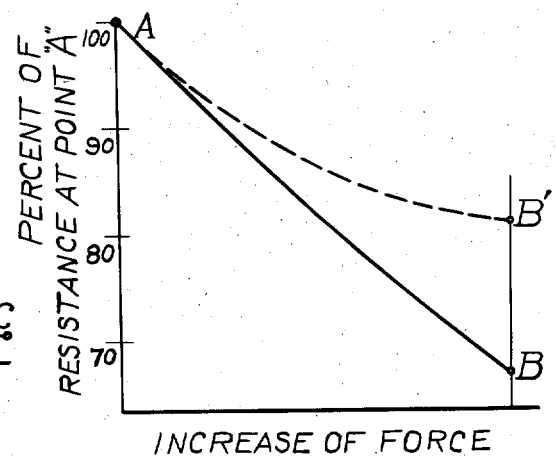
Figure 3:
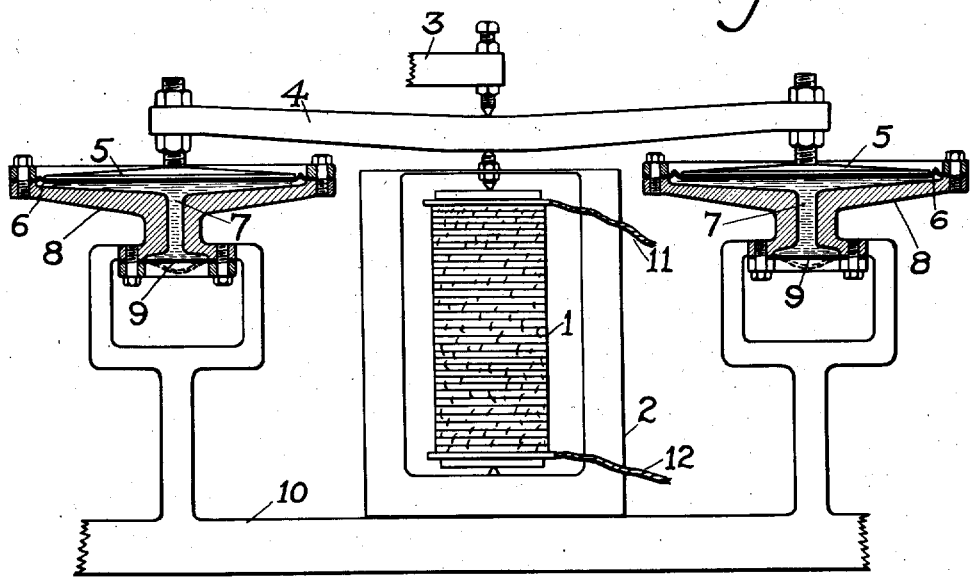
Figure 4:
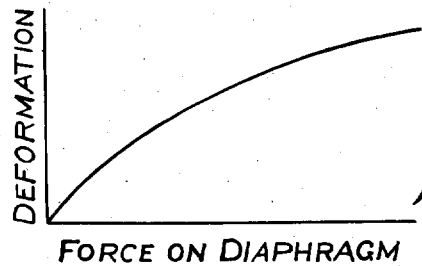
Figure 5:
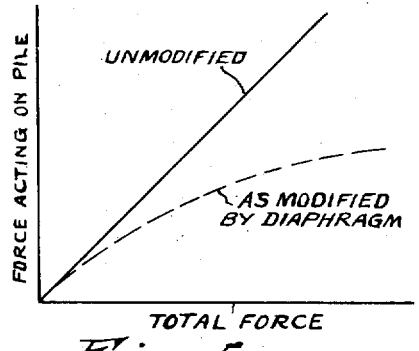
Figure 7A:
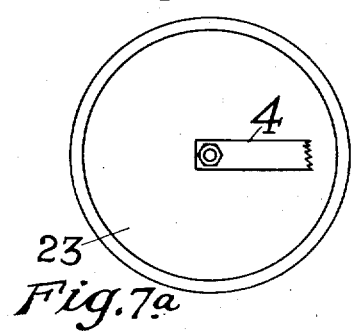
Figure 7:
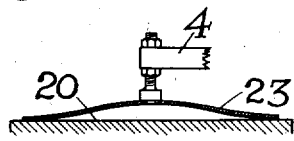
Figure 8:
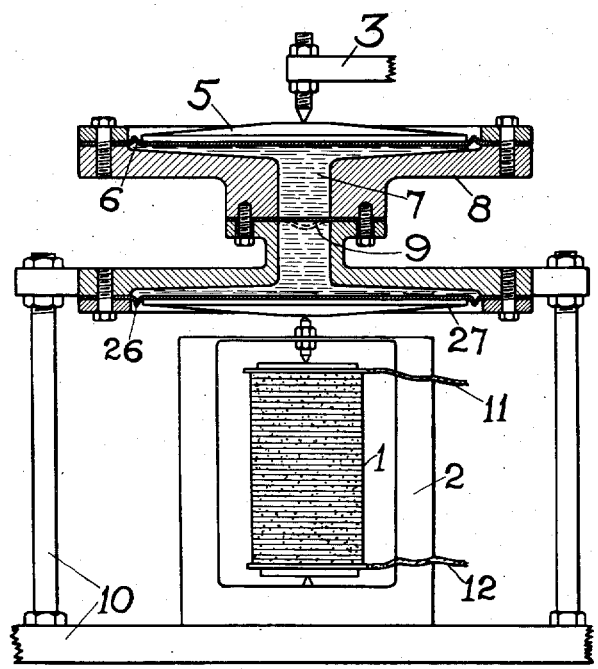
Figure 6:
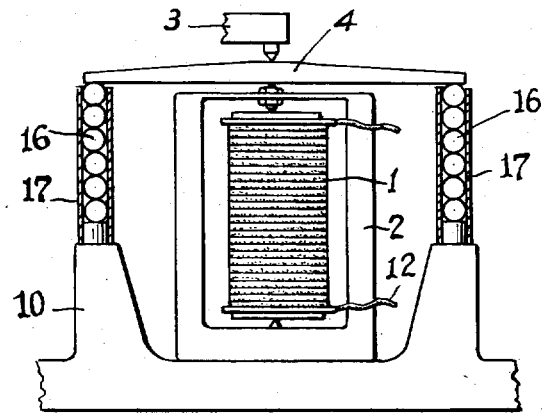
Figure 9:
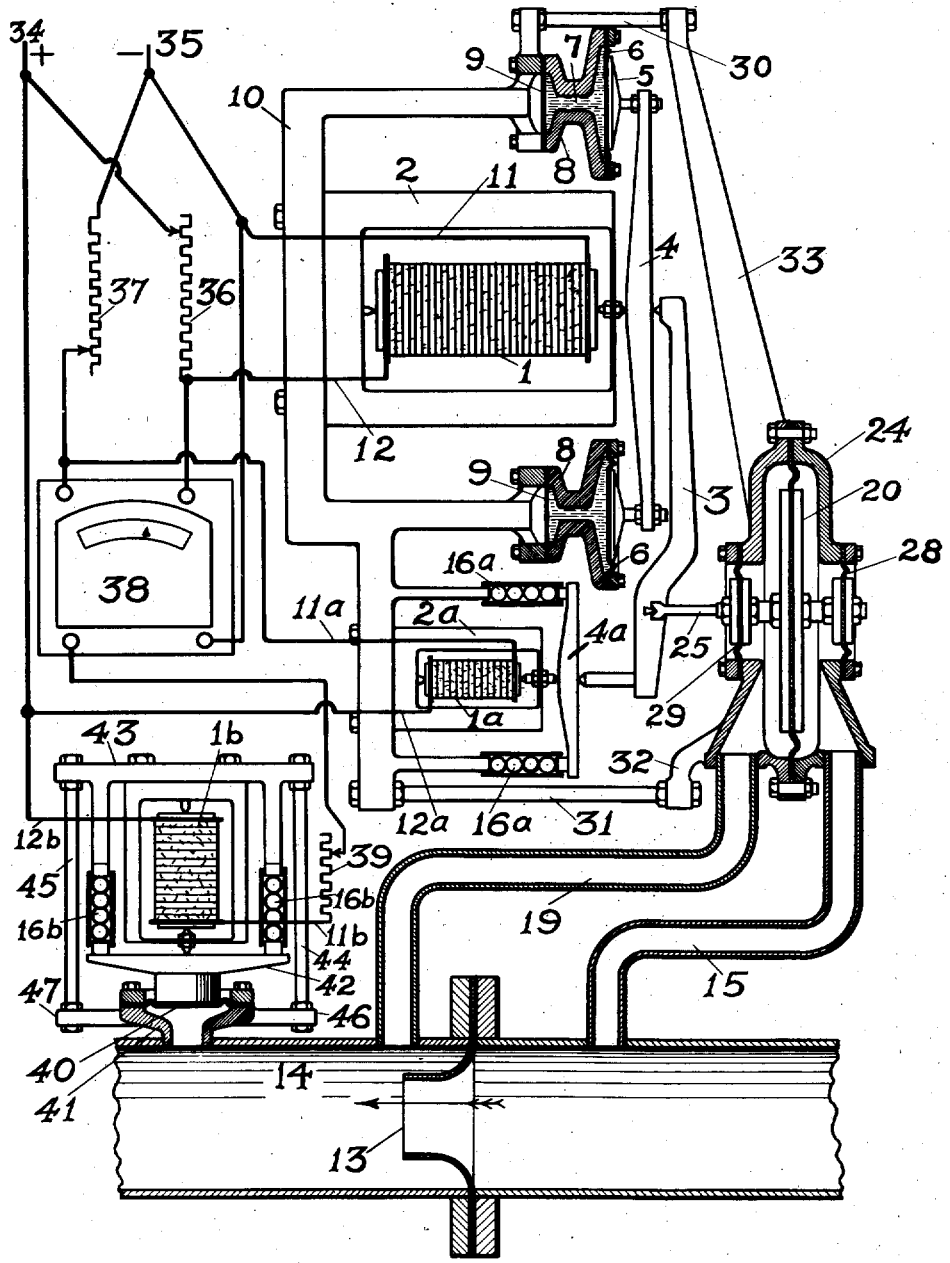

Referring to the accompanying drawings, Fig. 1 is a graph showing the relation of electrical resistance to pressure in a carbon-pile meter; Fig. 2 is an enlargement of the working section of this graph or curve, showing also the modification of the curve obtained by the use of this invention; Fig. 3 shows, partly in section, an elevation of a preferred form of the invention, in which a diaphragm-type pressure absorber is used; Fig. 4 is a graph showing the relation of deformation of a diaphragm to the force or pressure applied to it; Fig. 5 is a graph illustrating the relation between total force transmitted from the metering device, and force acting on the carbon pile; Fig. 6 an elevation showing the use of elastic spheres as the pressure-absorbing means; Fig. 7 illustrates in plan and sectional view a pressure-absorbing device using a curved spring in the form of a solid of revolution. Fig. 8 is a vertical section showing the diaphragm pressure-absorber used in series instead of in parallel with the carbon pile; Fig. 9 shows the connection of the carbon piles and pressure absorbing devices with the meter.

In the usual unmodified form of carbon pile used in metering apparatus, if the pressure applied to the pile be gradually increased from zero, the electrical resistance decreases very quickly at first, then more slowly. If the increase of pressure is continued until the curve of resistance, Fig. 1, has become rather flat, as at C, and then the pressure is progressively decreased, the characteristic curve for decreasing loads is not the same as for increasing loads, as shown by the broken-line curve in Fig. 1. This hysteresis effect causes inaccuracies in the readings of carbon pile meters when used over a wide range.

In order to eliminate the trouble from hysteresis, it is customary to confine the working range of carbon piles used in meters to a small portion near the "knee" of the curve, as from A to B in Fig. 1. This has the further advantage that the pile is always kept under considerable pressure, and is practically immune to jars or shocks; whereas at light pressures, jarring the pile may change both the zero reading and the entire characteristic of the pile.

In flow-meters, it is desired to have the pile work over a sufficiently long range of the characteristic curve to comprise a considerable curvature of the latter, in order to produce the desired relation between electrical potential (or current) and the rate of fluid flow, as described in Patent No. 1,581,957 issued to me on April 20, 1926. In the usable range between points A and B, however, the deviation of the curve from a straight line is small, which makes the production of the desired form of flow-meter curve very difficult.

In my present invention, I combine with the carbon pile one or more pressure-absorbing devices, of one of the forms shown and described, thereby enabling the desired form of curve to be obtained while confining the operation of the carbon pile within the most favorable working range between A and B, Fig. 1.

In the preferred form of the invention, shown in Fig. 3, the symbol 1 designates the carbon pile, and 2 a frame holding the pile, which frame may be of any of the usual types, and is not a subject of this invention; 3 is a member transmitting from the metering device to the carbon pile a force substantially proportional to the square of the rate of fluid flow, as described in Patent No. 1,581,957; 4 is a rigid member distributing this force between the carbon pile and the pressure-absorbing means. In each of pressure-absorbing means, 6 is a diaphragm, with rigid plate 5 pressing on its central area; 8 is a liquid-tight casing containing liquid 7, said liquid transmitting the pressure to another smaller elastic diaphragm 9 which is in contact with the liquid on one side but is free on its outer surface. Since diaphragm 6 is larger than diaphragm 9, a very small motion of the former will result in a considerably larger deformation of 9, as indicated by the broken lines under 9. In this embodiment of the invention, the proportion in which the metering force is divided between the carbon pile and the diaphragm is determined by the circumstance that, due to the rigidity of member 4, the deformation of each of the diaphragms 6 is substantially the same as the deformation of carbon pile 1. A thin diaphragm such as 9, when subjected to fluid pressure, has the property that its deflection increases much less rapidly than in proportion to the pressure exerted upon it, as shown by the graph, Fig. 4. Accordingly, as the total pressure applied to the system by means of member 3 increases, a greater and greater proportion of the increase is taken up by the diaphragms, and a smaller and smaller proportion is allowed to act on the carbon pile, as shown by Fig. 5.

Referring now to Fig. 2, which is an enlarged diagram of portion A—B of the characteristic curve of the carbon pile, namely the working portion; by the just-described action of the diaphragms the curve AB relating force to electrical resistance is modified to curve AB'. The latter has much more curvature than the un-modified curve, and is therefore suitable for use in flow-meters, in the manner described in Patent No. 1,581,957. For this purpose, electrical connections or leads 11 and 12 are provided, which correspond to connections 49, 52, 49a and 57 of Patent No. 1,581,957, and by means of which the carbon pile is connected in an electrical circuit in any of the arrangements shown in said patent. Member 3 corresponds to lever 33 in said patent; and member 10, on which frame 2 rests or to which it may be attached, may either replace member 19 of said patent, or may be attached to said member.

The connection with the meter is further illustrated by Fig. 9, in which 13 is an orifice located in pipe 14 in which the fluid to be measured flows, said orifice producing a pressure difference substantially proportional to the square of the rate of flow. This pressure difference transmitted through tubes 15 and 19 is caused to act on a diaphragm 20 in casing 24 to produce a force, also substantially proportional to the square of the rate of flow, which force is transmitted to the outside of the casing by rod 25 and is there applied to member 3 which transmits it to carbon piles 1 and 1a and pressure-absorbing means 9 and 16a. Diaphragms 28 and 29 are used to prevent escape of fluid from the casing to the outside. The forces transmitted through the carbon piles 1 and 1a and the absorbing means 9 and 16a are carried by frame 10 to bolts 30 and 31 and thence through the brackets 32 and 33 are returned to casing 24. Diaphragm 40 in casing 41 is acted on by the full steam pressure in pipe 14 and transmits its force through member 42 to another carbon pile 1b and to force-absorbing means 16b. The forces transmitted through said parts are carried by frame 43 to bolts 44 and 45 and thence returned through brackets 46 and 47 to casing 41. 34 and 35 are current supply lines from a source of constant voltage, and 36 and 37 are resistances connected in diagonally opposite branches of a Wheatstone bridge circuit, in the other branches of which are connected carbon pile 1 through leads 11 and 12, and carbon pile 1a through leads 11a and 12a, respectively. Across the mid-points of the Wheatstone bridge circuit is connected watt-meter 38. Another electric circuit passes from current supply line 34 through carbon pile 1b, through a resistance 39, to the second set of terminals of the wattmeter 38, and thence to current supply line 35; the purpose of this circuit, with carbon pile 1b and the parts acting therewith, is to correct for changes of density of the steam or other fluid in pipe 14, as described in Patent No. 1,581,957. I do not, however, limit myself to the use of the orifice meter, but may use any type of metering device in which the force produced increases with the rate of fluid flow.

Diaphragm 9 may be of metal or of any other suitable elastic material.

Instead of arranging the pressure-absorbing means in parallel with the carbon pile as just described, I may use such a device in series with the pile, that is, I may cause all of the force from the metering device to pass through the pressure absorber before reaching the pile. In the arrangement of this device shown in Fig. 8, the metering force acts through stiff plate 5 on diaphragm 6 and thereby exerts pressure on, and slightly displaces the liquid 7. This displacement deflects the small elastic diaphragm 9, as indicated by the broken lines beneath the latter, whereby a part of the force is absorbed before reaching the carbon pile, and is by-passed through the lower part of casing 8 to frame 10. The remainder of the pressure is transferred to the fluid on the other side of the diaphragm 9, and acts through diaphragm 26 and stiff plate 27 on carbon pile 1. Since the part of the pressure absorbed by diaphragm 9 increases more than in constant proportion to the deflection of 9, as indicated by the graph in Fig. 4, the desired modification of force acting on the pile is obtained, corresponding to the curve of Fig. 5. The action in this series arrangement is, therefore, not essentially different from the parallel arrangement using the same means and shown in Fig. 3.

In another form of the invention, I use elastic spheres in place of the combination of fluid and diaphragms, as shown in Fig. 6, in which the spheres are designated by 16, and 17 is a tubular casing holding them in place. The spheres have a pressure-deformation characteristic in which the deformation increases less rapidly than the force; the deformation, according to the Hertz derivation, being proportional to the two-thirds power of the total applied force.

Instead of diaphragms or elastic spheres, the pressure-absorbing device may take the form of a spring made in the form of a solid of revolution 23, Fig. 7, acting on flat surface 20.

In all of the embodiments of the invention, the relation between force absorbed, force exerted on the pile, and force produced by the metering device, may be modified by the use of intermediate levers; the use and proportioning of such levers, and choice of proportions of diaphragms and other parts being a matter of mechanical design and not of invention.

The invention is not confined to meters using carbon piles, but applies to meters using other forms of piezo-electric elements, for instance a crystal of Rochelle salt, which when subjected to torsion changes its electrical properties substantially in direct proportion to the torsional moment applied to it.

In flow-meters it is often desired to compensate for variations in density of compressible fluids caused by changes in the absolute pressure of the fluid flowing, as described in Patent No. 1,581,957. The compensating factor is seldom proportional to the pressure directly, and usually varies as the square root of the absolute fluid pressure. It is therefore necessary to modify the characteristics of carbon piles for this purpose also, from line AB in Fig. 2 to line AB'. The pressure-absorbing devices described above are used, therefore, in combination with the density-correction carbon piles designated 3 in said patent, as well as with the velocity-metering carbon piles designated 20 and 21 in said patent.

In Fig. 9, 1b indicates the density-correction carbon pile and 16b the pressure-absorbing means used with it.

Many other modifications may be made in the embodiment of the invention without departing from the spirit thereof.

I claim:

1. In meters using a compressible solid body whose electrical characteristics are variable in response to changes in pressure, the combination with said body of means to progressively modify the relation between electrical characteristics of said body and the force applied to it, as said force is increased.

2. In meters including a carbon pile, the combination with said carbon pile of means to progressively modify the relation between the electrical resistance of said pile and the force applied to it, as said force is increased.

3. In apparatus for measuring the flow of fluids, the combination with a head-type flowmeter including a compressible solid body whose electrical characteristics are variable in response to changes in pressure, of means for absorbing part of the pressure produced by the fluid flow, the fraction of said pressure absorbed by said means increasing at a greater rate than the increase of applied pressure, and means transmitting the pressure produced by the fluid flow to both the absorbing means and the said solid body.

4. In apparatus for measuring the flow of fluids, a head-type flowmeter including a compressible solid body whose electrical characteristics are variable in response to changes in pressure, an elastic element the deformation of which increases at a lower rate than the applied force, and means transmitting the force produced by the fluid flow both to the said solid body and to the elastic element and relating the deformation of said elastic element to the deformation of said solid body substantially in direct proportion.

5. In apparatus for measuring the flow of fluids, a head-type flowmeter, a carbon-pile compressometer, an elastic element the deformation of which increases at a lower rate than the applied force, and means transmitting the metering force of said flowmeter to both said compressometer and said elastic element and causing a deformation of said compressometer which is substantially the same as the deformation of said elastic element.

6. In apparatus for measuring the flow of fluids, a head-type flowmeter including a compressible solid body whose electrical characteristics are variable in response to changes in pressure, means including an elastic diaphragm absorbing part of the metering force produced by the fluid flow, and means transmitting said force both to said solid body and to the absorbing diaphragm.

7. In apparatus for measuring the flow of fluids, a head-type flowmeter including a compressible solid body whose electrical characteristics are variable in response to changes in pressure, means including elastic spheres absorbing part of the metering force produced by the fluid flow, and means transmitting said force both to said solid body and to the absorbing spheres.

8. In apparatus for measuring the flow of fluids, a head-type flowmeter including a compressible solid body whose electrical characteristics are variable in response to changes in pressure, a spring absorbing part of the metering force produced by the flow of the fluid, the stiffness of said spring increasing as its deflection is decreased, and means transmitting said force both to said solid body and to the absorbing spring.

9. In apparatus for measuring the flow of fluids, means producing a force which is substantially proportional to the square of the rate of flow, an electric circuit, a compressible solid body whose electrical characteristics are variable in response to changes in pressure, included in said circuit, means absorbing part of said force, the deformation of said absorbing means increasing at a lower rate than the force acting on it, and means transmitting the force produced by the fluid flow both to said solid body and to the absorbing means.

10. In apparatus for measuring the flow of fluids, means producing a force which is substantially proportional to the square of the rate of flow, an electric circuit, a compressible solid body whose electrical characteristics are variable in response to changes in pressure included in said circuit, means absorbing part of said force, the fraction of said force absorbed by said means increasing at a greater rate than the increase of said force, and means transmitting the force produced by the fluid flow both to said solid body and to the absorbing means.

JOHN DONALD KELLER.